G. H. HUNTING.
Egg-Forks.

No. 197,135. Patented Nov. 13, 1877.

Witnesses
Fred. Haynes
L. Allen

Inventor
George H. C. Hunting
by his Attorneys
Brown & Allen

UNITED STATES PATENT OFFICE.

GEORGE H. HUNTING, OF NEW YORK, N. Y., ASSIGNOR TO JAMES H. FERGUSON, OF SAME PLACE.

IMPROVEMENT IN EGG-FORKS.

Specification forming part of Letters Patent No. 197,135, dated November 13, 1877; application filed October 30, 1877.

*To all whom it may concern:*

Be it known that I, GEORGE H. HUNTING, of the city and State of New York, have invented certain new and useful Improvements in Egg-Forks, of which the following is a description, reference being had to the accompanying drawings, forming part of this specification.

This invention principally consists in a hand article for table use, applicable alike to picking up cooked eggs in the shell, and to holding them while being eaten, in which duplicate jaws formed of or with elastic fingers, both carried by the same handle or stem, and having the outer ends of their fingers inverted or bent outward to readily receive the egg within them, are used. Such construction of an egg-fork requires no special manipulation or opening and closing action of the article by the hand of the person using it to take up the egg, and to retain its hold thereon while being eaten, nor is there any liability to breakage of the egg by said fork.

Figure 1:
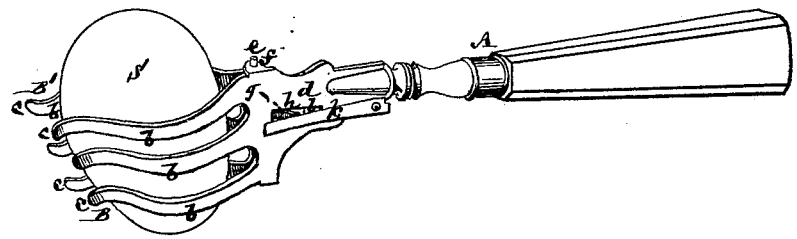
Figure 2:
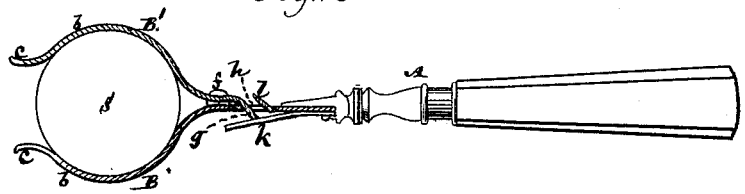

Figure 1 represents a view, in perspective, of an egg-fork constructed in accordance with my invention; Fig. 2, a partly sectional longitudinal view of the same, and Fig. 3 an outer end view thereof.

A is the handle or stem of single construction, as distinguished from a longitudinally-divided one having a movable joint. Said handle or stem, which may be constructed like that of an ordinary table-fork, carries at its forward end two reversely-bowed jaws, B B', composed of elastic fingers $b\ b$, which are not only bowed to receive the eggs within them, but have their outer ends $c\ c$ inverted or turned outward, whereby, when the fork is projected onto an egg to pick or take it up, the forward ends of the fingers are prevented from digging into or fracturing the shell, and the jaws easily yield or open to receive the egg within them.

Each jaw may have any number of fingers $b\ b$, and it is desirable that said fingers should not only be moderately elastic in themselves, to give a soft yet firm gripe on the egg, but that either or both of the jaws should be attached in an elastic manner to the handle or stem which carries them, to aid in perfecting the gripe, and to adapt the fork to different-sized eggs. Thus, one jaw, B, may have a fixed shank, $d$, which is rigidly or permanently connected with the stem or handle A, and the other jaw, B', be hung at its inner end by pivots $e$ in ears $f\ f$ on the shank $d$, and be provided with a shank or tail-piece, $g$, arranged to work through a slot, $h$, in the fixed shank $d$, and to bear on or against a spring, $k$, carried by said fixed shank, and having a tendency to close the one jaw relatively to the other. This spring, when closed, is restrained by the fixed shank $d$ from bearing on the tail-piece $g$ of the pivoted jaw B', so that when the fork is not in use there is no tension on the spring.

A stop, $l$, on the opposite side of the fixed shank $d$ to that of the spring $k$, serves to receive on or against it the tail-piece $g$ when the pivoted jaw B' is relieved from pressure of the spring $k$, whereby said jaw is kept from wholly closing, thus keeping the jaws in a slightly-open condition ready for use.

Figure 3:
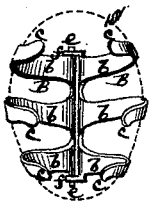

The jaws B B' have their fingers $b\ b$ preferably of irregular construction, being of a diminishing bow shape successively throughout both jaws, as shown in Fig. 3, whereby said jaws form a taper receptacle for the egg, in conformity with the shape of the latter, and serve as a cup to hold the egg free from all liability of it falling through or out of the jaws.

I claim—

1. An egg-fork composed of a single or whole stem or handle, and duplicate reversely-bowed jaws, formed of elastic fingers of a bow shape, and having their outer ends inverted or turned outward, substantially as specified.

2. The combination, with a single or whole stem or handle, of the reversely-bowed jaws, having an elastic action in relation with each other, independently of or in addition to the elasticity of the fingers with which said jaws are provided, substantially as specified.

3. The combination, with the fixed jaw B, having bowed fingers, and the whole stem or handle A, to which said jaw is attached, of the pivoted reversely-bowed jaw B' of fingers, the tail-piece or projection $g$ on said jaw, and the spring $k$, essentially as shown and described.

4. The stop $l$ on the shank $d$ of the fixed jaw B, in combination with the tail-piece $g$ of the pivoted jaw B', and the spring $k$, substantially as and for the purpose specified.

GEO. H. HUNTING.

Witnesses:
FRED. HAYNES,
EDWARD B. SPERRY.